(12) United States Patent
Duval et al.

(10) Patent No.: US 9,435,225 B2
(45) Date of Patent: Sep. 6, 2016

(54) EXHAUST CASE FOR A TURBOMACHINE WITH A FLEXIBLE HUB

(75) Inventors: Sylvain Yves Jean Duval, Tournan en Brie (FR); Yannick Durand, Yebles (FR)

(73) Assignee: SNECMA, Paris (FR)

( * ) Notice: Subject to any disclaimer, the term of this patent is extended or adjusted under 35 U.S.C. 154(b) by 502 days.

(21) Appl. No.: 14/115,166

(22) PCT Filed: May 3, 2012

(86) PCT No.: PCT/FR2012/050981
§ 371 (c)(1),
(2), (4) Date: Dec. 20, 2013

(87) PCT Pub. No.: WO2012/150418
PCT Pub. Date: Nov. 8, 2012

(65) Prior Publication Data
US 2014/0112772 A1    Apr. 24, 2014

(30) Foreign Application Priority Data

May 4, 2011 (FR) ..................................... 11 53791

(51) Int. Cl.
| | | |
|---|---|---|
| F01D 9/04 | (2006.01) | |
| F01D 25/24 | (2006.01) | |
| F01D 25/28 | (2006.01) | |
| F02C 7/20 | (2006.01) | |
| F01D 25/16 | (2006.01) | |

(52) U.S. Cl.
CPC .............. *F01D 25/24* (2013.01); *F01D 25/162* (2013.01); *F01D 25/243* (2013.01); *F02C 7/20* (2013.01); *F05D 2230/642* (2013.01); *F05D 2260/94* (2013.01); *F05D 2260/941* (2013.01)

(58) Field of Classification Search
CPC ............. F01D 9/044; F05D 2230/642; F05D 2240/91; F05D 2240/128; F05D 2260/94; F05D 2260/941
See application file for complete search history.

(56) References Cited

U.S. PATENT DOCUMENTS 4,798,514 A * 1/1989 Pask ....................... F01D 9/023
                                                    415/115
4,883,405 A * 11/1989 Walker ................... F01D 9/023
                                                    415/137

(Continued)

FOREIGN PATENT DOCUMENTS

FR           2 940 359           6/2010

OTHER PUBLICATIONS

International Search Report Issued Sep. 12, 2012 in PCT/FR12/050981 Filed May 3, 2012.

*Primary Examiner* — Eric Keasel
*Assistant Examiner* — Jason Davis
(74) *Attorney, Agent, or Firm* — Oblon, McClelland, Maier & Neustadt, L.L.P.

(57) ABSTRACT

An exhaust case for a turbomachine includes, from outside towards inside, yokes, a collar and a hub, which are annular and coaxial. The hub is connected to the collar by radial arms and extends between an annular flange and an inner collar capable of guiding a gas flow. In the hub each arm includes a rib in a shape of a triangle which ends with the flange. The inner collar is extended into the hub by a plate capable of transferring forces between the flange and the yokes. The plate can be advantageously inclined with respect to a radial plane. Two portions, which enclose a cut-out formed in a minimum-stress region along the plate, are coupled with pre-set plays. The case is capable of absorbing compression and traction at a thermal gradient.

9 Claims, 2 Drawing Sheets

(56) References Cited

U.S. PATENT DOCUMENTS 5,438,756 A     8/1995    Halchak et al.

7,798,768 B2 *   9/2010    Strain .................... F01D 9/042
                                                                                                                                            415/135

* cited by examiner

EXHAUST CASE FOR A TURBOMACHINE WITH A FLEXIBLE HUB

TECHNICAL FIELD

The invention relates to an exhaust case for a gas turbo engine fitted with a flexible hub.

Gas turbo engines comprise a case element, referred to as an exhaust case, downstream of the turbines. This case has a structural function and acts as a downstream support to the rotor elements of the engine, particularly making it possible to suspend the engine from a suspension member.

An exhaust case comprises at least one yoke for connecting the case to a suspension member, such as a strut, an outer collar and an inner hub, which are cylindrical and coaxial, the hub being connected to the outer collar by radial arms. The hub has a radially inner annular wall through which a shaft of the engine passes by means of suitable bearings, which additionally fix the radial arms. The hub also comprises an inner collar which forms a cylindrical envelope capable of guiding the flow of the gas engines.

In the hub cavity formed between the envelope and the inner wall, the circulation of air for cooling the rotor elements it supports, taken up upstream, creates an elevated temperature gradient in the radial arms which are in contact, outside of this cavity, with the high-temperature exhaust gases. Such a gradient is detrimental to the lifetime of the arms.

PRIOR ART

When producing the exhaust case parts for a gas turbine engine, the general problem is therefore to reconcile two types of stress: the static resistance to forces and the lifetime. Thus, in the static field, the loading is of the "imposed force" type, whereas it is of the "imposed displacement" type for lifetime calculations.

The solution adopted to reduce the stresses under an imposed force (or static loading) is to increase thicknesses. This solution is shown for example by patent document FR 2 917 458, filed in the name of the applicant. To reduce the concentration of stresses, this document provides reinforcement ribs formed at the base of each arm, the ribs being connected to upstream and downstream plates. But such an increase in thickness alters the distribution of the inner rigidities of the exhaust case, with the maximum stresses being at different locations.

Moreover, the stresses are concentrated at the junction between the arms and the inner annular wall of the hub. This concentration is also detrimental to the lifetime.

As regards lifetime, the stresses arise particularly from the thermal gradients within the exhaust case: local gradients, for example at the junction between the arms and the inner annular wall of the hub or, more importantly, the gradient between the collar and the hub. The solution therefore consists in allowing the exhaust case to expand as freely as possible.

The solutions thus appear contradictory: reinforcing the case to improve the static resistance and making the case suppler to extend the lifetime. More particularly, when the exhaust case hubs are cast as a single piece, the geometries retained for these hubs prevent a true compromise from being made between the resistance to static forces and lifetime performance.

Thus, in some flight phases, the thermal gradient between the hub and the collar can cause the hub to prevent free expansion of the collar. This prevention may generate strong forces and thus limit the lifetime.

For example, in rapid transitory flight phases, such as take-off, the thermal gradient can reach 200 to 300° C. between the outer collar (arms and collar: at 650-700° C.) and the hub (at approximately 400° C.).

If the hub is reinforced to meet requirements as regards resistance to static forces, it becomes too stiff and prevents thermal expansion of the collar via the arms. This can thus lead to problems of crack formation.

SUMMARY OF THE INVENTION

The object of the invention is to solve these problems by making compatible the stresses of resistance to static forces and of lifetime performance. For this purpose, the invention proposes producing a hub which is capable of absorbing compression and traction under static loading while leaving a play for expansion at a thermal gradient.

More specifically, the present invention relates to an exhaust case for a turbomachine, comprising, from the outside towards the inside, yokes for connecting the case to a suspension strut, an outer collar and a hub, which are coaxial, the hub being connected to the collar by radial arms. The hub extends between an inner collar, capable of guiding the gas flow, and an annular flange. In this hub, the inner collar is extended by at least one annular plate capable of transferring the forces between the annular flange and the suspension yokes, and each arm is extended by a radial rib comprising two portions enclosing a cut-out formed in a minimum-stress region, these portions being intercoupled with pre-set plays.

The solution allows the hub "to breathe" while taking up the static forces when necessary. The minimum-stress regions are determined by all known means, in particular by simulation under thermal loading and locating the stress regions on the basis of the dimension parameters.

In particular embodiments:
the portions are joined by welding;
the portions are formed by two rods provided with complementary heads which are capable of forming a closure, the clearances between the opposed heads defining the plays;
the plate extends annularly through the hub between the inner collar and the annular flange, at an incline preferably of between 0 and 45°, and more preferably from 10 à 30°, with reference to a radial plane;
the plate is substantially conical;
each rib has a generally triangular shape which extends substantially between regions corresponding to leading edges and trailing edges of the arm at the inner collar and the annular flange.

PRESENTATION OF THE DRAWINGS

Other features and advantages of the present invention will become apparent upon reading the following detailed description, with reference to the accompanying drawings, in which.

DETAILED DESCRIPTION

In the text, the qualifiers "inner" (or equivalent) and "outer" (or equivalent) relate to a location of an element which is comparatively closer to and further from the central axis X'X.

Figure 1:
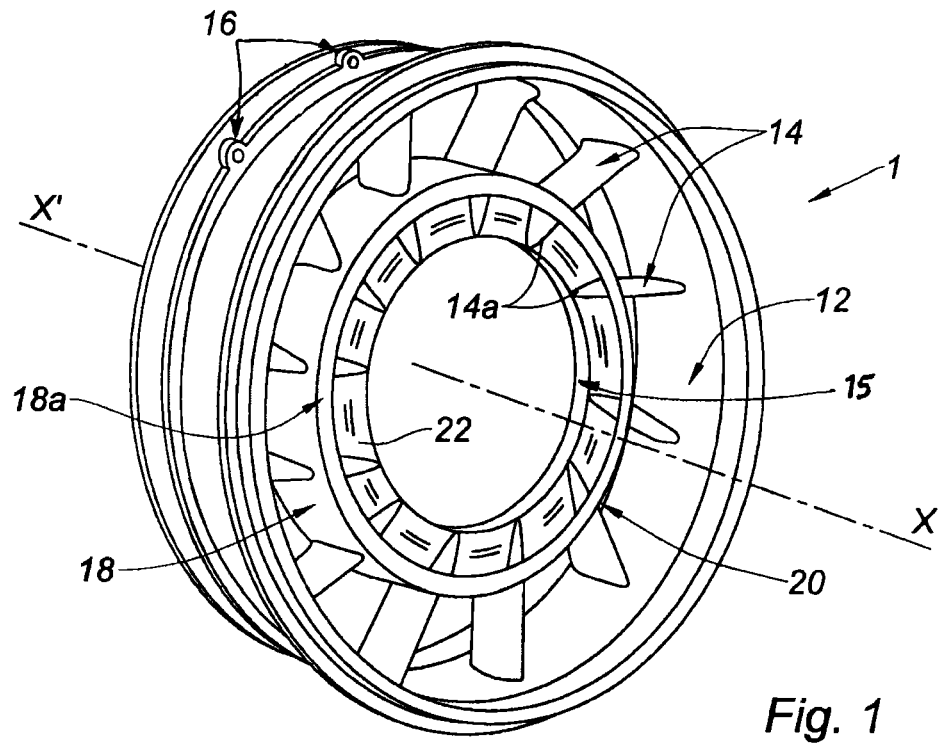
FIG. 1 is a schematic perspective view of a sample exhaust case for a turboreactor according to the invention.

FIG. 1 is a schematic overall view of a sample exhaust case 1 for a turboreactor according to the invention. This case comprises a plurality of annular structures which are coaxial about the central axis X'X, namely a radially outer collar 12 and an inner collar 18 which are interconnected by a plurality of regularly distributed radial arms 14, and a flange 15. Yokes 16 for connection to a suspension strut (not shown) of the case 1 are formed on the collar 12. The inner collar 18 is extended radially upstream by an annular projection 18a for guiding the gas flow originating from the final, upstream turbine of the turboreactor.

The yokes 16 and a central portion of the collar 12 are cast as a single piece and have as many sectors as arms. The arms 14, made of metal sheeting, are joined by welding. The central part or hub 20 of the case 1 is delimited by the inner collar 18 and the flange 15.

The hub 20, including the inner collar 18, is also cast as a single piece. As described hereafter in more detail, this hub 20 comprises an annular plate 22 and ribs 14a which radially extend the arms 14.

Figure 2:
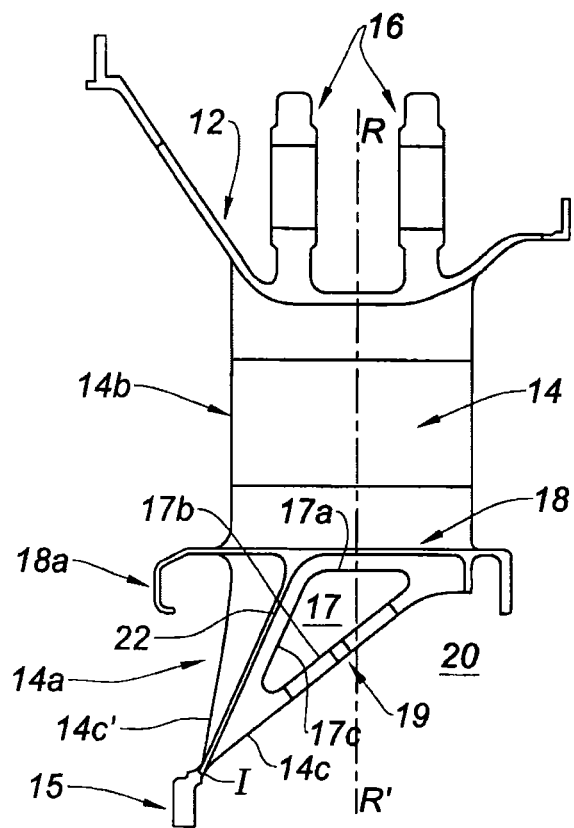
FIG. 2 is a partial cross-sectional view of the case in FIG. 1.

The partial cross-sectional view of the case 1 in FIG. 2 shows, from the outside towards the inside: the yokes 16, the collar 12, an arm 14 and the inner collar 18. Each arm 14 extends into the hub 20 via a generally triangular, radial rib 14a. The intersection "I" of the edges 14c and 14c' of this triangle is itself extended by an annular flange 15 for supporting a bearing of the engine shaft (not shown).

Advantageously, the leading edge 14c' of the rib 14a is substantially parallel to the leading edge 14b of the arm 14.

Moreover, the inner collar 18—which is extended at the leading edge by the annular guiding projection 18a—is extended into the hub 20 by the annular plate 22. The plate 22 connects the collar 18, starting towards the centre of this collar, and the flange 15. As a result of the offset of the rib 14a, the plate is advantageously inclined with respect to the radial plane RR'. In the example, the incline of the plate 22 is approximately 30°.

In addition, each rib 14a has a cut-out 17 of which one side 17c is substantially parallel to the plate 22. Another side 17a of this cut-out is substantially parallel to the collar 18 and its third side 17b is substantially parallel to the trailing edge 14c of the rib 14a. The cut of the cut-out 17 is optimised by simulation so that this cut-out coincides with a minimum-stress region.

Figure 3:
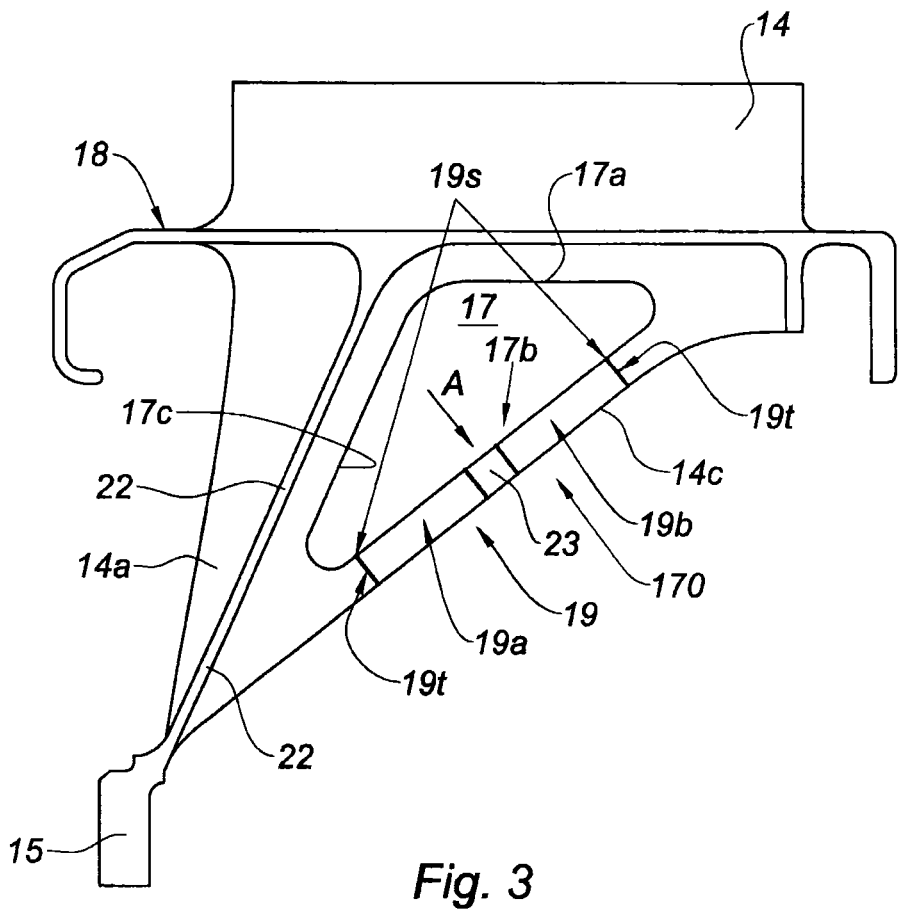
FIG. 3 is an enlargement of the hub of the case in FIG. 2, showing welded portions.

The extension part 19 of the arm 14a, which part is formed between the cut-out 17 and the side 14c of this extension, is shown in the greatest detail in FIG. 3, which is a partial enlargement of FIG. 2. This part 19 comprises two rods 19a and 19b which are joined by welds 19s on the end sections 19t.

Figure 4:
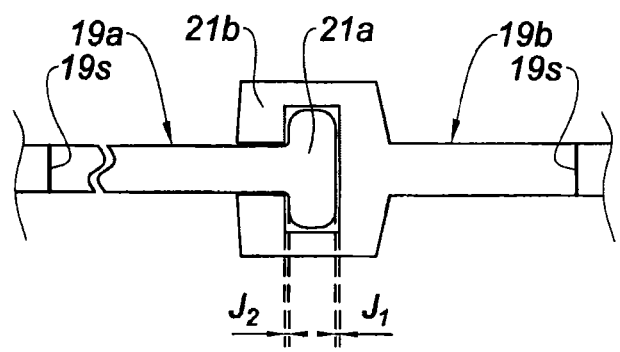
FIG. 4 is a view of the welded portions in FIG. 3 in the direction "A".

The rods 19a and 19b enclose the cut-out 17 by means of a "flexible" closing connection having determined adjustment plays. The view in the direction "A" in FIG. 3 shows, in FIG. 4, this closing connection 23. The two rods 19a and 19b end in two complementary heads 21a and 21b, in the shape of a "T" and of a "C" respectively. The clearances "J1" and "J2" between the heads 21a and 21b define the plays which are able to be "consumed" during thermal expansion.

The plays J1 and J2 are calculated by simulation on the basis of the thermal expansion which occurs at various operating phases of the engine. Since the stresses are not homogenous along the plate 22, the rods 19a and 19b are advantageously joined as close as possible to the minimum-stress region corresponding to the cut-out 17.

This combination of plate 22 and ribs 14a allows the static loadings to be supported, with a flexible part 19 (FIG. 2), which allows for a greater stress margin under thermal loading. This margin also allows better acceptance of deviations from the thermal conditions in the start-up phase.

The invention is not restricted to the embodiments described and shown. Thus, the portions for closing the cut-out can be formed first integrally with the edging of the cut-out while it is cut, and then by separating and combining the ends by means of a male-female connection joined with an appropriate play.

Moreover, it is possible to form a plurality of plates, for example a plate at the attack edge and a plate at the trailing edge.

Moreover, the plates may be curved. The ribs and the cut-outs may have various shapes: oblong, oval, etc.

The invention claimed is:

1. An exhaust case for a turbomachine, comprising, from an outside towards an inside:
   yokes, an outer collar and a hub, which are coaxial, the hub being connected to the outer collar by radial arms and extending between an inner collar, for guiding a gas flow, and an annular flange;
   wherein in the hub, the inner collar is extended by at least one annular plate for connection between the annular flange and the inner collar to transfer forces between the annular flange and the yokes; and
   wherein each radial arm is extended by a radial rib comprising two opposed portions enclosing a cut-out formed in a central minimum-stress region of the rib, the portions being intercoupled with pre-set plays.

2. An exhaust case according to claim 1, wherein the portions are joined by welding.

3. An exhaust case according to claim 1, wherein the portions are formed by two rods including complementary heads which are capable of forming a closure, clearances between opposed heads defining the pre-set plays.

4. An exhaust case according to claim 1, wherein the at least one annular plate extends annularly through the hub between the inner collar and the annular flange.

5. An exhaust case according to claim 4, wherein the at least one annular plate is inclined between 0 and 45° with reference to a radial plane, or between 10 to 30°.

6. An exhaust case according to claim 1, wherein the at least one annular plate is substantially conical.

7. An exhaust case according to claim 1, wherein each radial rib has a generally triangular shape.

8. An exhaust case according to claim 7, wherein each radial rib extends substantially between regions corresponding to leading edges and trailing edges of the arm at the inner collar and the annular flange.

9. An exhaust case according to claim 8, wherein each radial rib has a leading edge in an extension of the leading edge of a corresponding arm, the leading edge of each radial rib being extended by the annular flange.

* * * * *